United States Patent
Siegel

[15] 3,656,587
[45] Apr. 18, 1972

[54] CHECKOUT COUNTERS

[72] Inventor: Joel S. Siegel, 229 East 79th Street, New York, N.Y. 10021

[22] Filed: May 25, 1970

[21] Appl. No.: 40,141

[52] U.S. Cl..............................186/1 A, 312/201, 312/250
[51] Int. Cl..........................................................E04h 3/04
[58] Field of Search....................186/1, 1.1, 1.1 C; 312/201, 312/249, 250

[56] References Cited

UNITED STATES PATENTS

| | | | |
|---|---|---|---|
| 3,077,950 | 2/1963 | Brown | 186/1.1 |
| 3,186,515 | 6/1965 | Potrafke | 186/1.1 |
| 3,262,519 | 7/1966 | Cohen | 186/1.1 |
| 2,669,343 | 2/1954 | Berry | 186/1.1 |

Primary Examiner—Harvey C. Hornsby
Attorney—Blum, Moscovitz, Friedman & Kaplan

[57] ABSTRACT

A checkout counter of the type used in supermarkets. The checkout counter has a conveyor belt means provided with an upper run moving from a front toward a rear end of the conveyor belt means so that articles placed on the upper run will be conveyed toward the rear end of the conveyor belt means. Beside the conveyor belt means is a cash register support means. This cash register support means is movable along the conveyor belt means to a selected one of a number of positions which include a front position adjacent the front end of the conveyor belt means, a rear position adjacent the rear end of the conveyor belt means, and an intermediate position between the ends of the conveyor belt means. At the front position the cash register support positions a cash register for use during transfer of articles directly from a cart onto the front end of the conveyor belt means. At the rear position the register is available for use during express checkout operations. In the intermediate position the cash register is located for use during unloading of a cart situated beside the conveyor belt means between the ends thereof.

7 Claims, 3 Drawing Figures

PATENTED APR 18 1972

3,656,587

INVENTOR.
JOEL S. SIEGEL

BY
Blum, Moscovitz, Friedman & Kaplan
ATTORNEYS

CHECKOUT COUNTERS

BACKGROUND OF THE INVENTION

The present invention relates to checkout counters.

Thus, the present invention relates to checkout counters of the type used in supermarkets in connection with the operation of a cash register during checking out of purchased articles.

Such checkout counters are of course very well known. They generally have a conveyor belt system of some type for conveying articles toward the rear end of the checkout counter where a packing station is located, and a suitable support is provided for a cash register so that the operator can totalize the cost of all of the articles as they are fed toward the rear of the checkout counter where the packing operations take place.

Conventional checkout counters of the above general type suffer from certain drawbacks. Thus, such checkout counters are used for conventional operations when loads of average magnitude are to be transferred from a cart onto the checkout counter. However, the very same checkout counters are to be used for express checkout operations in the case where very small numbers of articles are purchased by any one purchaser. In this case, only a relative small number of articles are placed on the conveyor belt, so that there is a considerable waste of time and labor involved simply in transferring the small number of articles to the rear of the checkout counter where the bagging takes place.

On the other hand, there are known systems where a cart is situated at the front end of the conveyor belt and the operator at the cash register transfers each article from the cart onto the conveyor belt while totalizing the cost of the articles. For these operations it is required that the register be situated at an extreme front end position, so that only specially constructed checkout counters have been available up to the present time for purposes of this latter type.

Because of the above considerations, there is either a waste of time and labor involved in certain specialized operations, such as express checkout operations, or the conventional checkout counter simply does not lend itself for certain types of operations such as those where articles are directly transferred from a cart onto the checkout counter by the operator at the cash register.

SUMMARY OF THE INVENTION

It is accordingly a primary object of the present invention to provide a checkout counter which will avoid the above drawbacks.

In particular, it is an object of the invention to provide a checkout counter construction which can readily be adapted for different types of operations.

More specifically, it is an object of the invention to provide a checkout counter which can be easily adjusted either for conventional operations, for express checkout operations, or for operations at the front end of the checkout counter in connection with direct transfer of articles from a wagon to the counter by the operator of the cash register.

Thus, it is an object of the invention to provide a single checkout counter construction which lends itself to the different uses as referred to above, so as to achieve for each of these uses a high degree of efficiency, thus eliminating the losses inherent in conventional constructions while at the same time doing away with the necessity of having checkout counters of a specialized construction suitable only for specialized uses.

It is also an object of the present invention to provide a construction of this type which is of low cost and composed of simple rugged elements which operate very reliably.

Furthermore, it is an object of the invention to provide for a checkout counter construction of the above general type a bagging station where improved bagging operations can take place.

In this latter connection, it is an object of the invention to provide a bagging station where either bags can be loaded with articles or a box can be loaded if desired.

According to the invention, the checkout counter includes a conveyor belt means having front and rear ends and having an upper run which is accessible for receiving articles which are conveyed by the upper run toward the rear end of the conveyor belt means. A cash register support means is situated beside the conveyor belt means for movement to a selected one of a plurality of positions which include a front position adjacent the front end of the conveyor belt means, a rear position adjacent the rear end of the conveyor belt means, and an intermediate position between the ends of the conveyor belt means. When in its front position, the cash register support means supports a cash register at a location suitable for direct transfer or articles by the operator of the cash register from a cart onto the conveyor belt. The cart now will be positioned at the front end of the conveyor belt means forming an extension of the latter.

When the cash register support means is in its rear position, the cash register is located adjacent the rear end of the conveyor belt means so as to greatly improve the efficiency of the operations in connection with express checkout where only small numbers of articles are purchased by each customer and these articles can be registered or checked and bagged simultaneously. In the intermediate position the cash register is located at a point suitable for use with normal loads which are transferred onto a conveyor belt means from a location at the side thereof opposite from the cash register.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
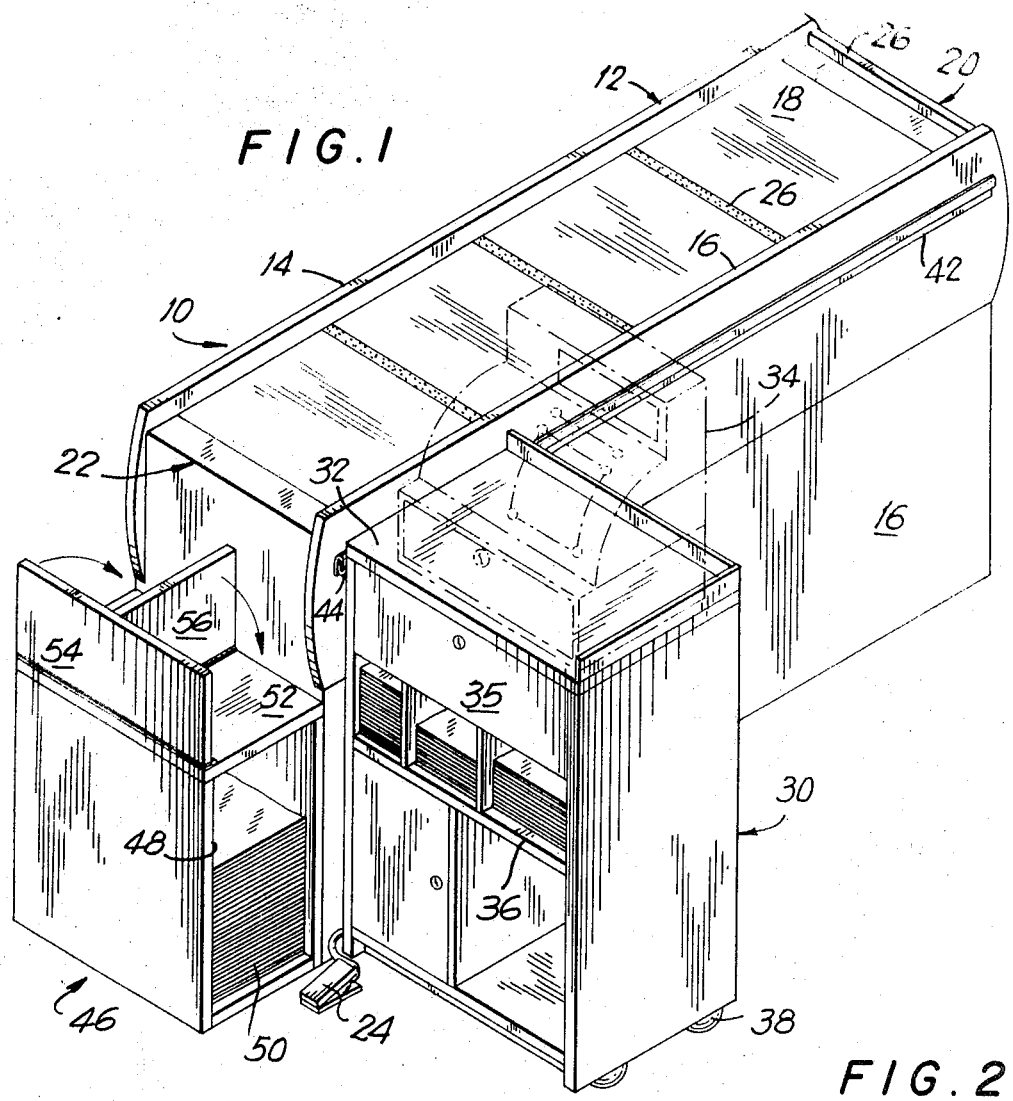
FIG. 1 is a perspective illustration of an embodiment of a checkout counter according to the invention.

Referring now to the drawings, the checkout counter 10 of the invention which is illustrated therein includes a conveyor belt means 12. This conveyor belt means 12 has opposed side walls 14 and 16 forming a space between which the conveyor belt is located. This conveyor belt has an upper run 18 which moves during operation of the conveyor belt from the front end 20 of the conveyor belt means toward the rear end 22 thereof. This conveyor belt means is conventional and includes any endless flexible substantially non-stretchable sheet material capable of carrying articles and supported for movement on end rollers at least one of which is driven from a transmission which in turn is driven from a motor which can be controlled from a foot switch 24 accessible to the operator. The exterior surface of the belt can be provided with markers 26 in the form of strips of a suitable color fixed to the exterior surface of the belt so as to divide this surface into areas for receiving successive loads from successive customers. Naturally, if desired, certain bars or rods can be available to be situated between the loads.

The side walls of 14 and 16 extend to an elevation somewhat higher than the upper run 18 of the conveyor belt means, and at the region of the front end 20 a transverse bar 28 may be provided.

Situated beside the conveyor belt means 12, and more particularly next to the wall 16 thereof, is a cash register support means 30 in the form of a table having a top surface 32 on which a cash register 34 can be supported, this cash register being indicated in phantom lines in the drawings. The table 30 may have any suitable drawers 35 and compartments 36 for the convenience of the operator of the cash register 34. This table 30 is supported on casters or rollers 38 which enable the support means to be moved along the conveyor belt means 12.

Figure 3:
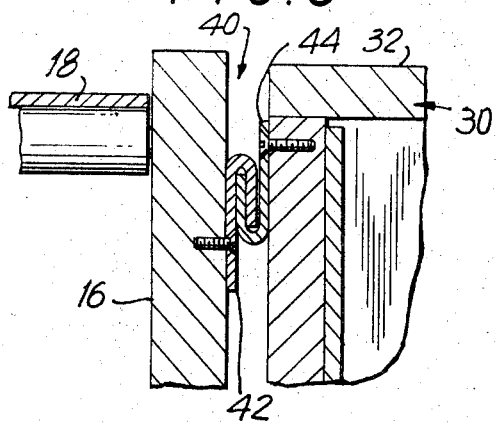
FIG. 3 is a fragmentary enlarged transverse section, taken along line 3—3 of FIG. 2 in the direction of the arrows, and showing the details of a guide means.

For this latter purpose, in order to maintain the support means 30 positioned beside the conveyor belt means 12, a guide means 40 is provided. As is particularly apparent from FIG. 3, the guide means 40 includes a pair of rails 42 and 44 respectively fixed to and extending horizontally along the wall 16 and the table 30. The rail 42 has a substantially inverted U-shaped cross section, while the rail 44 has a substantially upright U-shaped cross section, and these rails extend into each other in the manner shown in FIG. 3 so that they coact to guide the support means 30 along the conveyor belt means 12.

At the region of its rear end 22, the conveyor belt means is situated next to a bagging station where a bag support means 46 is located. This latter bag support means 46 is in the form of a frame defining a compartment 48 where bags 50 can be stored, and it will be noted that this compartment 48 opens only toward the operator in front of the cash register 34 when the operator is situated adjacent the rear end 22 of the conveyor belt means 12.

According to a further feature of the invention the bag support means 46 has an upper flat wall 52 on which flaps 54 and 56 are hinged with elongated piano hinges. These flaps are mutually perpendicular so that they can be set up in the manner shown in FIGS. 1 and 2. In this position bags may be located on the wall 52 with the flap 56 situated between the bags, and thus a pair of bags can be very efficiently loaded with such an arrangement. On the other hand, the flap 56 can be turned down and then the flap 54 can be turned down over the flap 56 covering the latter as well as the wall 52 to provide the support means 46 with a flat horizontal upper surface enabling a tote-box or the like to be placed directly on the now horizontal flap 44 to be directly loaded, with a bag situated within such a box if desired.

Figure 2:
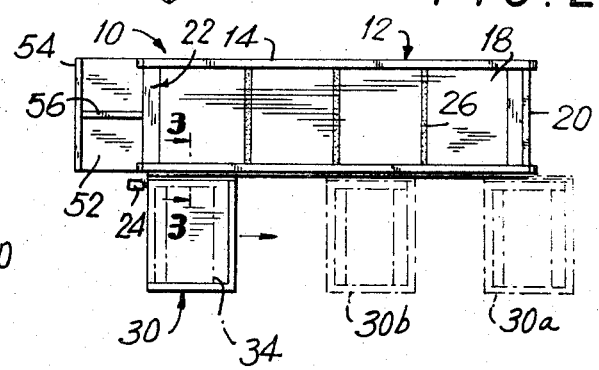
FIG. 2 is a schematic top plan view illustrating different possible positions of a cash register support means with respect to a conveyor belt means.

With the above-described structure it is possible to situate the cash register support means 30 at a selected one of a number of different positions, these different positions being indicated in FIG. 2. Thus, in solid lines the support means 30 is shown at a rear position adjacent the rear end 22 of the conveyor belt means 12. However, the support means 30 may also have the position 30a indicated in FIG. 2, which is a front position adjacent the front end 20 of the conveyor belt means 12. Finally, the cash register support means 30 may have a position 30b, which is an intermediate position between the ends of the conveyor belt means 12.

In the solid line position, which is the rear position of the support means 30, the cash register 34 is located directly next to the rear end 32 of the conveyor belt means 12. This is the express checkout position. When operating with the support means 30 in this position, each purchaser will purchase a relatively small number of articles which can be placed from a cart directly onto the upper run 18 adjacent the front end 20 and conveyed to the rear end 22. Thus, the cash register operator will be located at the rear end 22 next to the bagging station so that simultaneous bagging and checking operations can be very quickly carried out in a most efficient manner.

As is well known, there are certain types of carts which have front walls which can be swung down directly into overlapping relation with the front end of the conveyor belt means with the cart forming an extension of the conveyor belt means. When operating under these conditions the cash register is situated at the front end of the conveyor belt means so that the operator at the cash register can manually transfer each article from the cart onto the conveyor belt while totalizing the costs of the various articles. Heretofore it has been required to provide specially constructed checkout counters for these operations. However, with the structure of the invention it is only necessary to shift the support means 30 to the position 30a shown in FIG. 2, and with the support means 30 in the position 30a, operations of this latter type can be very effectively carried out. Thus, a special structure for this purpose is not required.

On the other hand, a purchaser may wish to place the cart beside the wall 14 on the side of the conveyor belt means 12 opposite from the cash register to transfer the articles from the cart directly onto the upper run 18 between the front and rear end thereof. These are the conventional operations where the cash register can be located at the intermediate position determined by the location 30b shown in FIG. 2. In this position normal loads of articles will be placed by the purchaser onto the conveyor belt means with the operator totalizing the costs of all of the articles as they are conveyed toward the rear end 22, with the articles of such fairly substantial loads normally being spread between the rear end 22 and the intermediate location of the cash register, so that a high degree of efficiency is achieved under these conditions.

When operating in the intermediate position 30b, it is possible to place a bar similar to the bar 20 across the conveyor belt means over the upper run 18 thereof beside the cash register so that the purchaser will place articles between the front end 20 and such a bar while the operator will be required to manually transfer each article over the intermediate bar between the latter and the rear end 22, during totalizing with the cash register. In this way it is possible to achieve with the illustrated structure the same effect as a pair of independent conveyor belts one for feeding the articles up to the cash register and the other for feeding the articles beyond the cash register to the bagging station.

Also, although the support means 30 can be freely moved at any time between the several positions as indicated above, if desired a releasable lock device of any type may be used for releasably locking the support means 30 at a selected position.

By providing the bag support means 46 with the opening 48, the operator will have free access to the bags 50 while the possibility of customers helping themselves to the bags will be diminished.

It is thus apparent that with the above-described structure of the invention a simple construction of low cost is provided enabling the checkout counter to be easily adapted for different types of operations which can be carried out with a high degree of efficiency.

What is claimed is:

1. In a checkout counter, elongated conveyor belt means having front and rear ends and having an upper article-receiving run movable from said front toward said rear end to convey articles placed on the latter run toward the rear end of said conveyor belt means, and cash register support means situated beside said conveyor belt means and guide means being provided between paid support means and said conveyor belt means permitting movement of said support means; along said conveyor belt means to a selected one of a plurality of positions which include a front position adjacent the front end of said conveyor belt means for facilitating operation of a cash register simultaneously with transfer of articles from a cart to the front end of said conveyor belt means, a rear position adjacent the rear end of said conveyor means for use of a cash register during express checkout operations when articles are transferred from a cart directly to said conveyor belt means and conveyed to the region of the rear end thereof, and an intermediate position between the ends of said conveyor belt means for use during unloading of articles from a cart situated alongside said conveyor belt means at a side thereof opposite from said cash register support means.

2. The combination of claim 1 and wherein said guide means includes coacting rails respectively fixed to said conveyor belt means and said support means.

3. The combination of claim 2 and wherein said rails include an elongated rail member fixed to said conveyor belt means and having a substantially inverted U-shaped cross section, and a rail of upright U-shaped cross section connected to said register support means and extending into said rail connected to said conveyor belt means while the latter rail extends into that which is connected to said support means.

4. The combination of claim 3 and wherein said support means includes a table having a bottom end provided with rolling components for rolling along a floor during movement of said table to a selected one of said positions.

5. The combination of claim 1 and wherein a bag-supporting means is situated next to said front end of said conveyor belt means.

6. The combination of claim 5 and wherein said bag-supporting means includes a horizontal wall having a pair of flaps hinged thereto and being perpendicular to each other so that when said flaps are in an upright position a pair of bags can be situated on said bag-support means while when said flaps are turned to a horizontal position a box or the like can be directly loaded.

7. The combination of claim 5 and wherein said bag-support means includes a hollow storage compartment for storing bags, said hollow storage compartment having an open end directed toward an operator situated in the front of said support means when the latter is at the region of said rear end of said conveyor belt means.

* * * * *